Figure 1A:
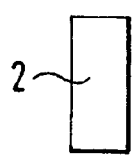
Figure 1B:
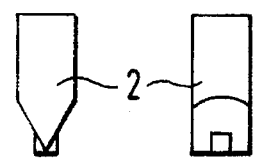

United States Patent [19]
Li

[11] Patent Number: 5,609,776
[45] Date of Patent: Mar. 11, 1997

[54] METHOD OF REPAIRING MOULDS MADE OF ALUMINIUM

[75] Inventor: Yan Li, Shanghai, China

[73] Assignee: Novapax Kunststofftechnik Steiner GmbH & Co. KG, Berlin, Germany

[21] Appl. No.: 576,311

[22] Filed: Dec. 21, 1995

[30] Foreign Application Priority Data

Dec. 23, 1994 [DE] Germany ............ 44 47 403.2

[51] Int. Cl.$^6$ ............................................. B23K 9/04
[52] U.S. Cl. ........................... 219/76.14; 29/402.18
[58] Field of Search ................... 164/92.1, 495, 164/496; 29/402.01, 402.18; 219/76.14

[56] References Cited

U.S. PATENT DOCUMENTS

| | | | |
|---|---|---|---|
| 3,004,336 | 10/1961 | Timuska | 29/402.18 X |
| 3,711,310 | 1/1973 | Leeper, Jr. | 29/402.18 X |
| 4,654,501 | 3/1987 | Piatt | 219/76.14 |
| 5,085,363 | 2/1992 | Sims | 219/76.14 X |
| 5,321,224 | 6/1994 | Kamimura et al. | 219/76.14 X |

FOREIGN PATENT DOCUMENTS

| | | | |
|---|---|---|---|
| 63-248563 | 10/1988 | Japan | 164/495 |
| 1558595 | 4/1990 | U.S.S.R. | 219/76.14 |

*Primary Examiner*—J. Reed Batten, Jr.
*Attorney, Agent, or Firm*—Marshall & Melhorn

[57] ABSTRACT

A pointed wire-shaped filling material made of aluminium is utilized to contact the point at a position of an aluminium mould to be repaired. The wire-shaped filling material is charged with a current in order to melt the point of the filling material and form an arc which melts the mould at the position of repair. The filling material is then pressed into the mould at the position to be repaired. Upon filling the repair point, the wire-shaped filling material is cut close to the surface of the mould to complete the repairing process.

11 Claims, 3 Drawing Sheets

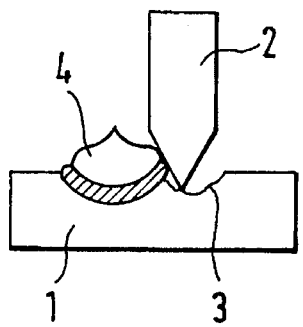
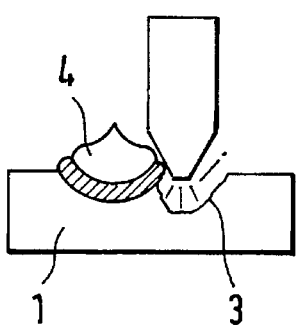
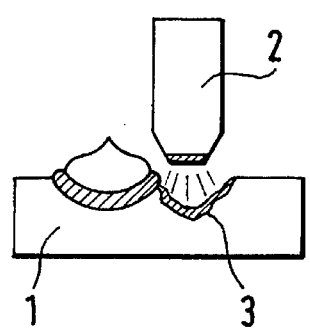
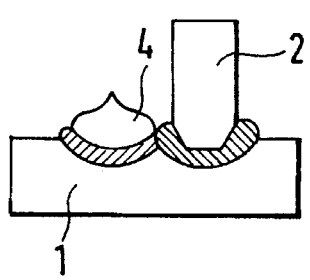
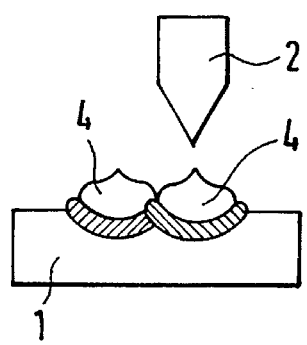
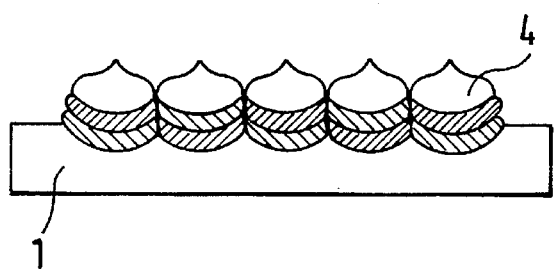

METHOD OF REPAIRING MOULDS MADE OF ALUMINIUM

The invention relates to a method of repairing moulds made of aluminium.

In injection molding, moulds made of aluminium are used which during their life are exposed to mechanical stresses and in many cases become damaged. Previously it was usual to scrap such moulds or, in the case of larger moulds, to remove the damaged point and insert a new part. This is extremely expensive, and frequently the weld points between mould and inserted parts are visible.

Welding with the addition of supplementary material has until now not been used, as in welding, for example arc welding, distortion of the material and discoloration occurs which in particular does not permit the repair of the smallest surfaces. Therefore the purpose underlying the invention now is to provide a method of repairing moulds made of aluminium, which may be used both for repairs at positions of small dimensions and also for larger surfaces, distortion of material or discoloration of material being avoided.

By means of the method according to the invention, with application of a high current charge for a short duration, only the point of the wire-shaped filling material and the surface of the damaged position on the mould are melted, and when the wire-shaped filling material is pressed into the damaged position, the molten material combines, so that buckling of the mould, burning away or discolorations do not occur and, by means of finishing work on the repaired position, a mould with the original dimensions is made available. In this way moulds may be relatively simply prepared and it is no longer necessary to discard moulds which are still basically capable of functioning.

A particular advantage of the method according to the invention is that even larger positions may be repaired, the filling material being applied to adjacently-lying positions, and that these adjacently-lying positions may be combined together by a non-melting electrode after ignition of an arc, melting on the introduced filling material and subsequently pressing the electrode on to the molten surface area. Larger surfaces may also be repaired by multiple application of filling material to adjacently-lying positions, the charging of the wire-shaped filling material with a current not only melting the material of the mould but also the filling material lying adjacent thereto and previously applied, thus combining with the new filling material to be applied. This method is also suitable for the repair of welding defects from previous repairs.

Deeper-lying damage in aluminium moulds may also be repaired by multiple applications of filling material above one another in a plurality of layers.

Particularly good results are obtained with a current supply which delivers a current of 200 A to 1500 A for a period of 0.5 ms to 10 ms for charging the wire-shaped filling material, with an open-circuit voltage of a maximum of 15 V during the discharge.

Particularly good welds of the repair positions are obtained if the method is carried out under a protective gas atmosphere. More advantageously, argon is used as a protective gas.

The steps of the method are shown diagrammatically in the annexed drawing and will be explained in more detail in the following description. Shown are:

FIGS. 1a to 1g: the method steps according to a first embodiment of the present invention;

FIGS. 2a to 2e: the method steps according to a further embodiment of the invention;

FIGS. 3a to 3e: the method steps according to a further embodiment of the invention;

FIG. 4: a diagrammatic view of a repaired position, and

FIGS. 5a to 5d: the method steps according to a further embodiment of the invention.

FIG. 1 shows diagrammatically the procedure of the method, 1 referring to the mould made of aluminium to be repaired, and 2 to a wire made of filling material, i.e. aluminium. At the start the wire 2 is provided according to FIG. 1a, which may be cut in a simple way with a special cutting pliers, and which is shown from the front and from the side in FIG. 1b. As can be seen, a wider position is left in the centre of the otherwise wedge-shaped point, which serves as an ignition point for initiation of the welding procedure. The design of the point is important for rapid and quiet initiation of the arc.

Figure 1C:
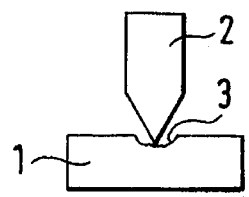
Figure 1D:
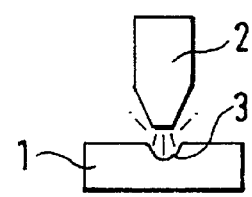
Figure 1E:
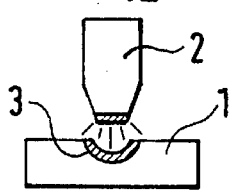

The wire is mounted in a holder (not shown), which is connected to a current source, and according to FIG. 1c brought into contact with its point at the damaged position 3 of the mould 1, and the current is switched on. Because of the high current, the point melts off at the contact position, the contact is broken and an arc forms between the point of the wire 2 and the damaged position, according to FIG. 1d.

The current supply is delivered by a switching circuit which includes a storage condenser, the energy required for the arc being supplied from the charge of the condenser, whose discharge time determines the duration of the arc.

Due to the form of the point of the wire 2 and the rapid ignition of the arc, almost the entire stored energy of the condenser is used for the arc heat and not for a "resistance heat" which is much less effective.

Figure 1F:
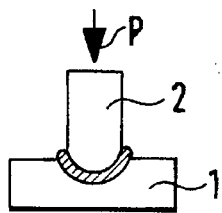
Figure 1G:
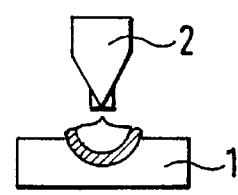
Figure 2A:
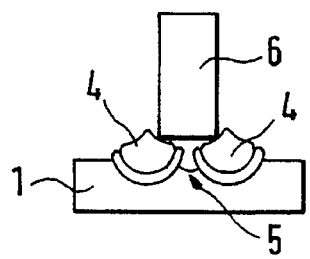
Figure 2B:
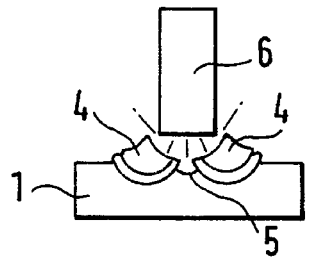
Figure 2C:
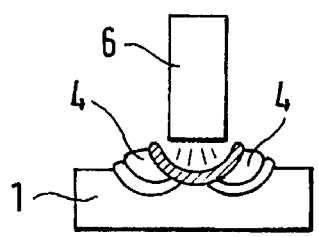
Figure 2D:
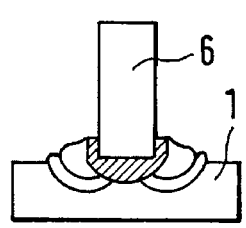
Figure 2E:
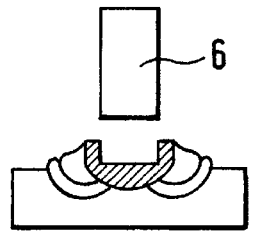

The surfaces of the point of the wire 2 and of the damaged position 3 on the mould 1 are melted by the action of the arc (FIG. 1e) and, according to FIG. 1f, the wire 2 is pressed on to the damaged position 3, an axial pressure being applied to the holder for the wire, or simply gravity.

When they are pressed together, a portion of the molten metal bulges out between the wire 2 and the mould 1 and fills the crater formed by the arc, reinforcing the connection. According to FIG. 1g, the wire 2 is cut off a short distance above the surface of the mould 1, a new point being preferably simultaneously formed for the next welding procedure. If no further filling material is to be applied, the residues of the projecting wire or of the molten metal are ground off and polished.

The current for generating the arc is high and of short duration, in order that only the point of the wire made of filling material and the surface of the damaged position are melted, and no buckling with alterations in the dimensions of the mould occurs. The magnitude of the current and its duration are previously and empirically ascertained in dependence on the size of the wire of filling material.

The method reveals particularly good results if it is carried out using argon with a purity of greater than 99.99% (argon 4.6) as a protective gas.

If larger areas of the mould 1 are damaged, the procedure is that in accordance with the method steps illustrated in FIG. 2. According to FIG. 1, the filling material is applied at a plurality of adjacently-lying positions of the damaged part of the mould 1, as FIG. 2a shows. Thus, in most cases, there is no fusion between the individual positions 4 supplied with filling material, so that untreated positions 5 remain unaffected. In order to fuse adjacently-lying positions 4 together and if necessary to eliminate welding defects, according to FIG. 2a a copper or tungsten electrode is inserted into the corresponding holder instead of the wire 2 of filling material. The electrode 6 is brought into light contact with the metal at the positions 4 supplied with filling material, and the condenser for current supply is discharged, so that according to FIG. 2b an arc is ignited. As the electrode 6 has a high melting point, only the deposited filling material is again melted, according to FIG. 2c. By means of pressing the electrode 6 on to the position to be connected, the molten material is pressed into the position 5 not supplied with filling material, and the positions supplied with filling material are joined together (FIGS. 2d, 2e).

In this way, large-area damage to a mould may also be repaired by the application of filling material at a plurality of positions, which, according to FIG. 2, are connected together by means of an electrode. Any welding defects are thus simultaneously removed. The positions are ground and polished in a finishing stage.

A further method for repairing large-area damage is shown in FIG. 3. In this case filling material is applied (not shown) firstly to a position on the aluminium mould to be repaired, as described above. Then, as FIG. 3a shows, a wire 2 of filling material provided with a point is placed directly next to the position 4 supplied with filling material, without touching the filling material of position 4, and, as described above, charged with a current (FIG. 3b). The point of the wire melts and an arc forms (FIG. 3c). In this way not only the mould 1, but also the filling material of position 4 are melted, and the filling material, the mould and the wire join together (FIG. 3d), when the wire is pressed on to the repair position. Finally, the wire can be cut off (FIG. 3e), forming a new point. This method may be repeated any number of times in the case of large-area damage.

FIG. 4 shows a large-area damaged position 4 of an aluminium mould 1 which has been repaired by the multiple application of filling material as shown in FIG. 3. In addition, due to the depth of the damage, a plurality of layers of filling material were applied one above the other, in order totally to repair the damage. The portions of filling material projecting out of the mould 1 may then be finished, in order for example to obtain a smooth repaired surface.

Figure 5A:
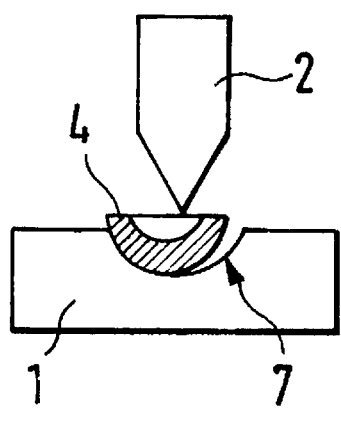
Figure 5B:
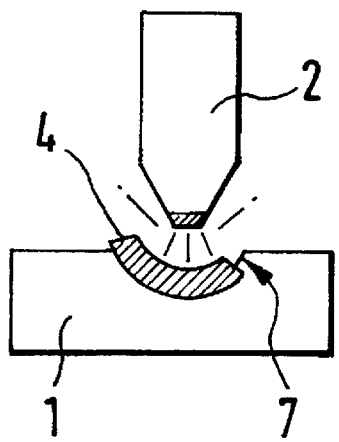
Figure 5C:
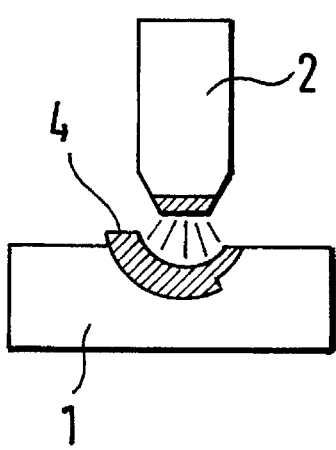
Figure 5D:
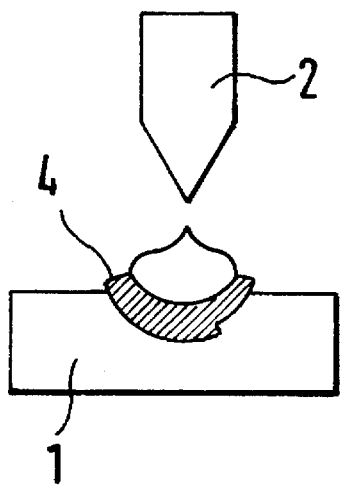

In a similar way, welding defects from a preceding repair may be removed by means of the method according to the invention. FIG. 5a shows a mould 1 with a position 4 supplied with filling material and smoothed, in which a gap 7 remains between the mould 1 and the filling material. In order to repair this gap, a wire 2 of filling material is applied with its point on the existing filling material (FIG. 5a) and charged for 0.5 ms to 10 ms with a current of 200 A to 1500 A. Therefore the point of the wire 2 melts, and an arc forms between the wire 2 and the mould 1 (FIG. 5b). Thus the existing filling material is again melted and flows (FIG. 5c), and upon pressing the point into position, combines with the wire 2. The wire 2 is then cut off (FIG. 5d), and the filling material in the damaged position 4 may be further treated for example in order to produce a smooth, finished surface of the mould 1.

I claim:

1. A method of repairing moulds made of aluminium, characterised by the following steps:

trimming the end of a wire-shaped filling material made of aluminium to form a point, making contact with the point at a position of a mould to be repaired, said mould being made of aluminium, charging the wire-shaped filling material with a current in order to melt away the point of the filling material and form an arc, melting the mould at the position to be repaired, and the filling material, pressing the filling material into the mould at the position to be repaired, and cutting the wire-shaped filling material close above the surface of the mould.

2. Method according to claim 1, characterised that the current initiating the arc is generated by a condenser discharge.

3. Method according to claim 1 or 2, characterised in that, after being pressed in, the wire-shaped filling material is cut off to form a point.

4. Method according to claim 1, characterised in that the position provided with filling material is smoothed and polished.

5. Method according to claim 1 for larger surface to be repaired, characterised in that successive adjacent positions within the surfaces to be repaired are supplied with filling material in such a way that, when new filling material is applied, the filling material located adjacent to it is likewise melted and forms a connection with the newly-applied filling material.

6. Method according to claim 1, characterised in that a plurality of layers of the filling material are applied one over the other.

7. Method according to claim 1 for larger surfaces to be repaired, characterised in that the filling material is applied at at least two adjacent points of the surface to be repaired, in that an electrode consisting of a material with a higher melting point than that of the filling material is applied to areas of the at least two adjacent points, and an arc is ignited, which melts surfaces of the applied filling material, and in that the electrode is pressed on to the molten surface area, and connects the filling material together at two adjacent points.

8. Method according to claim 1, characterised in that the wire-shaped filling material is charged for 0.5 ms to 10 ms with a current of 200 V to 1500 V with an open-circuit voltage of 15 V during the discharge.

9. Method according to claim 1, characterised in that the method is carried out under a protective gas atmosphere.

10. Method according to claim 9, characterised in that argon is used as a protective gas.

11. Method according to claim 5, characterised in that a plurality of layers of filling material are applied one over the other.

* * * * *